United States Patent
Nakagawa

[11] Patent Number: 5,819,009
[45] Date of Patent: Oct. 6, 1998

[54] DUAL DIRECTIONAL RECORDING APPARATUS AND RECORDING SYSTEM

[75] Inventor: Yoshihiro Nakagawa, Tokyo, Japan

[73] Assignee: Canon Kabushiki Kaisha, Tokyo, Japan

[21] Appl. No.: 996,105

[22] Filed: Dec. 23, 1992

[30] Foreign Application Priority Data

Dec. 26, 1991 [JP] Japan .................................. 3-345065

[51] Int. Cl.⁶ .................................................. B41J 19/14
[52] U.S. Cl. .......................................... 395/105; 395/117
[58] Field of Search ........................... 364/519; 395/108, 395/105, 110, 117, 114, 115, 109, 111, 326, 1.1

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,933,875 | 6/1990 | Kojima | 364/519 |
| 4,978,971 | 12/1990 | Goetz et al. | 395/105 |
| 4,996,650 | 2/1991 | Kenbo | 364/519 |
| 5,044,796 | 9/1991 | Lund | 400/323 |
| 5,131,075 | 7/1992 | Wilkes et al. | 395/105 |
| 5,233,365 | 8/1993 | Uemura et al. | 395/108 |
| 5,245,362 | 9/1993 | Iwata et al. | 346/140 |
| 5,250,956 | 10/1993 | Haselby et al. | 395/105 |
| 5,258,773 | 11/1993 | Arakawa et al. | 395/108 |
| 5,347,617 | 9/1994 | Well et al. | 395/108 |

FOREIGN PATENT DOCUMENTS

| | | |
|---|---|---|
| 0396315 | 11/1990 | European Pat. Off. . |
| 0450929 | 10/1991 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 1108058 | 4/1989 | Japan . |
| 9014957 | 12/1990 | WIPO . |

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

A text portion is extracted by scanning each page of drawing information from application software. When the height of characters used in the text to be recorded falls within the range of the width of recording head elements of a recording apparatus, commands for designating the number of dots corresponding to the character height to be recorded and for setting a dual direction as the recording direction of a portion constituted by text alone are transmitted to the recording apparatus, for recording of the text portion.

32 Claims, 9 Drawing Sheets

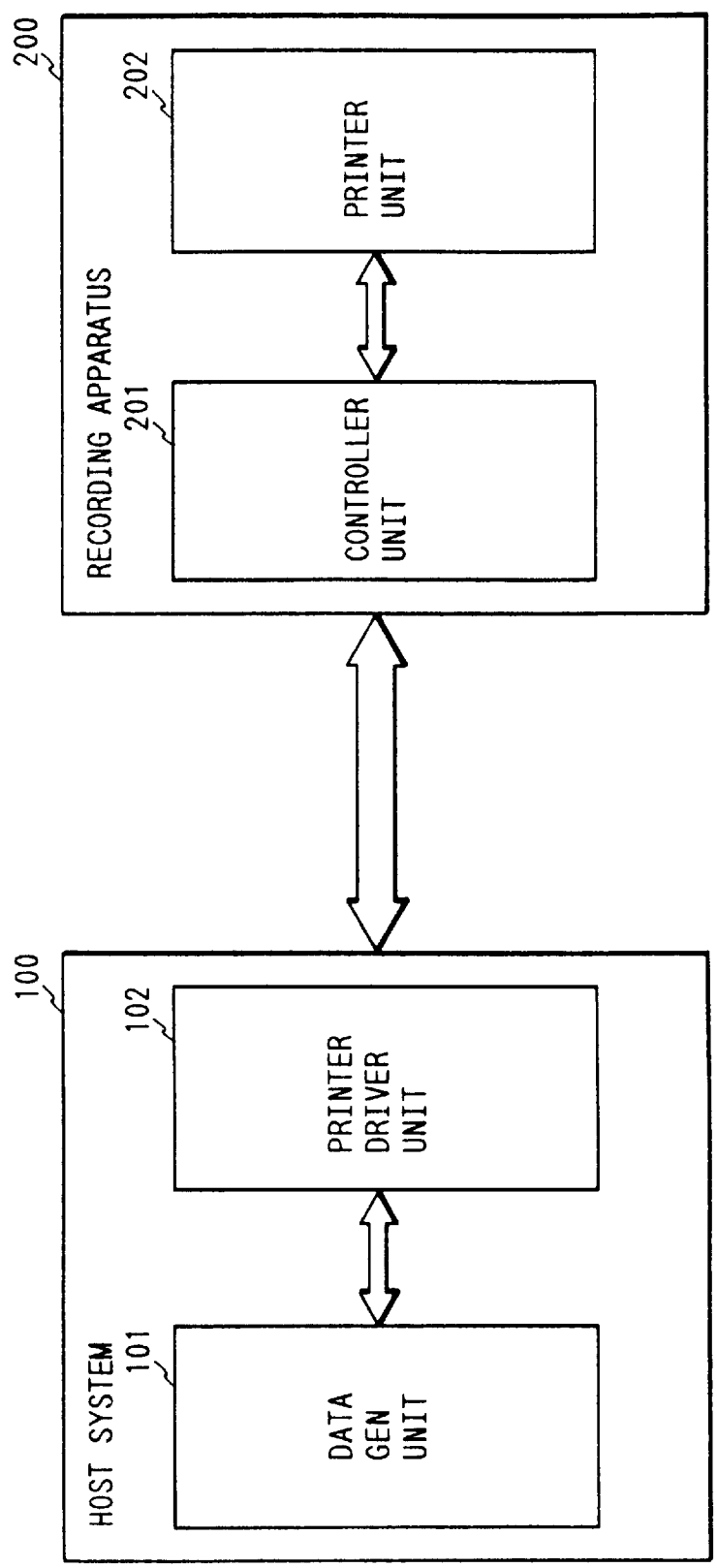

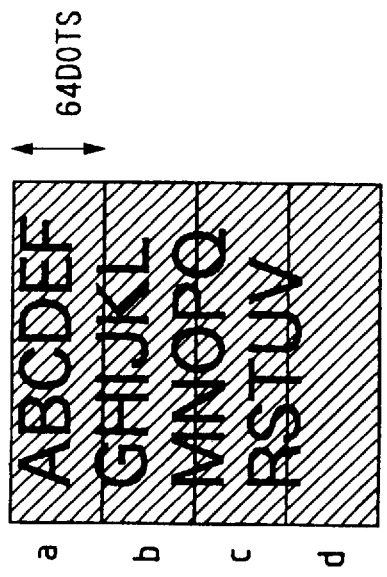
FIG. 3B
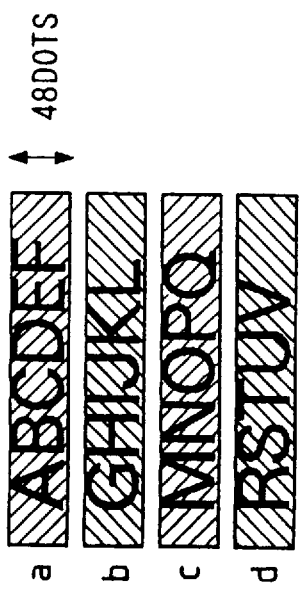
FIG. 3A
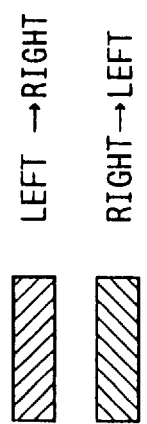

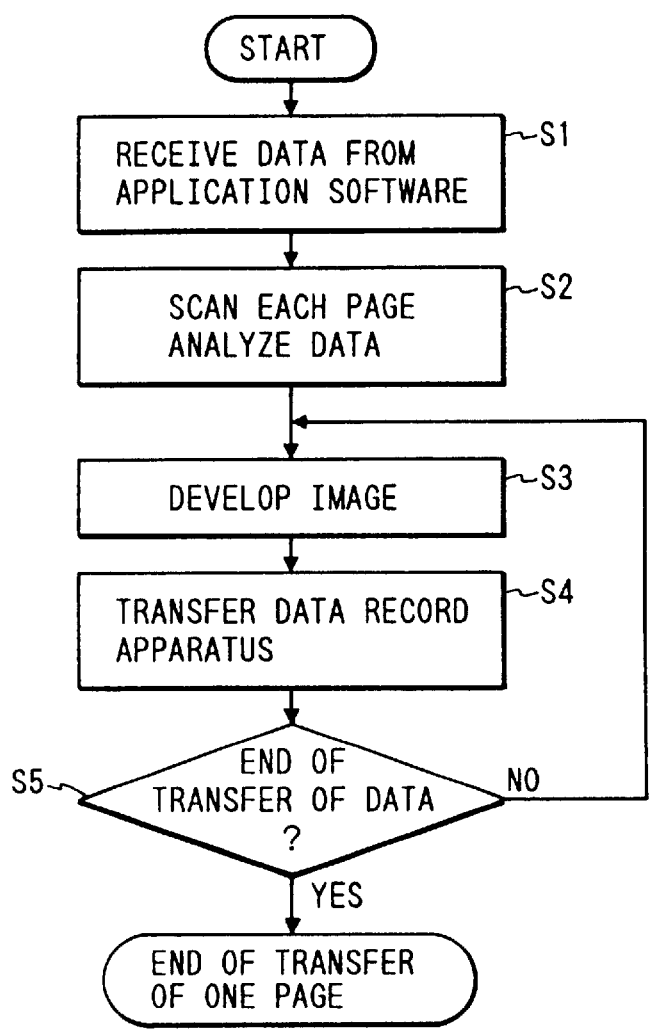

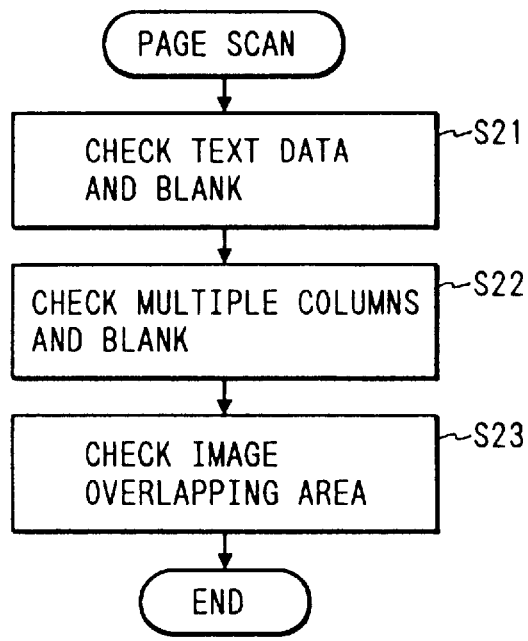

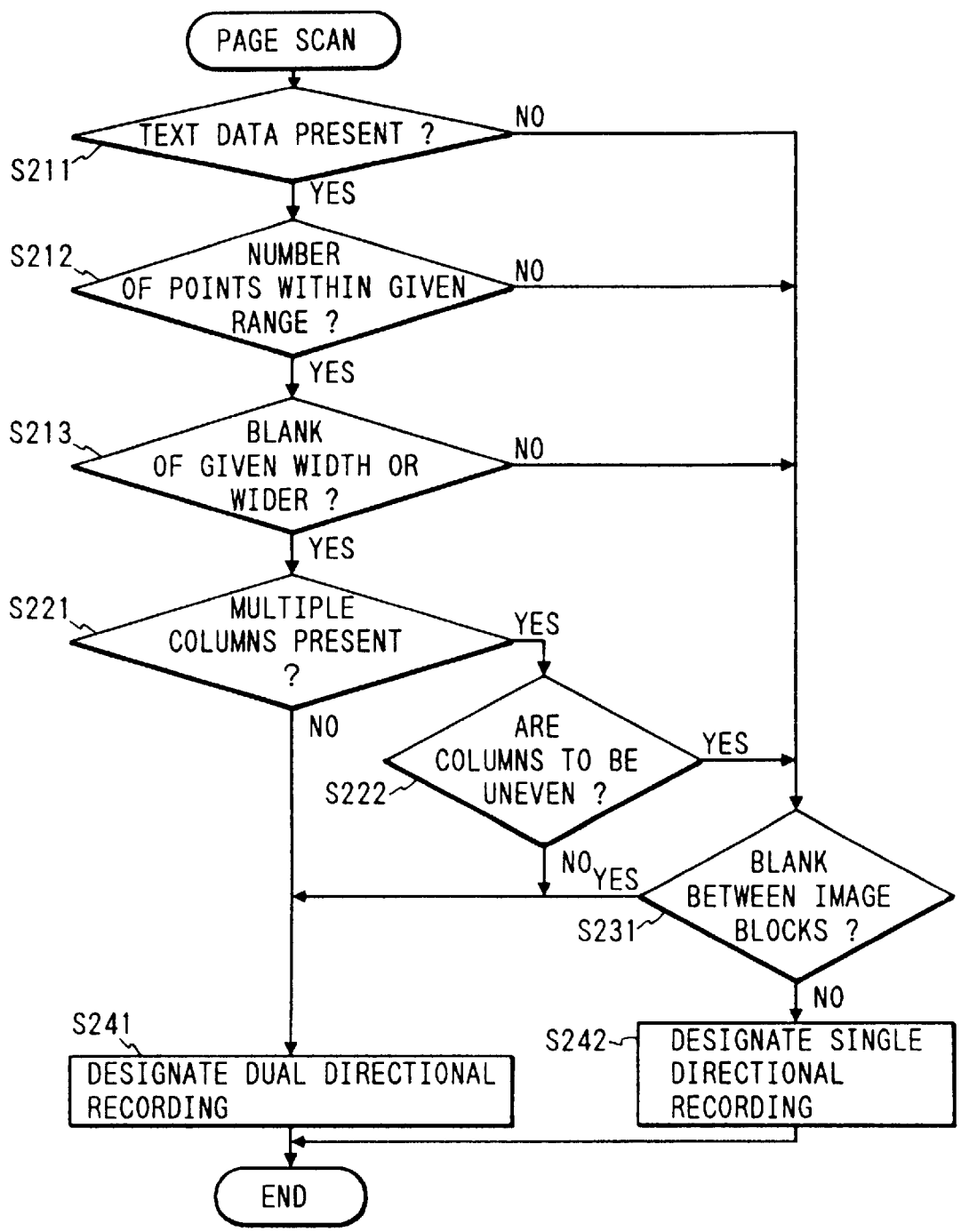

FIG. 7A

| SETTING OF RECORDING DIRECTION | SINGLE/DUAL |

FIG. 7B

| SETTING OF RECORD START POSITION | START POSITION |

FIG. 7C

| SETTING OF HEIGHT OF RECORD DATA | HEIGHT |

FIG. 7D

| SETTING OF IMAGE RECORD | DATA LENGTH (n) | DATA (n) |

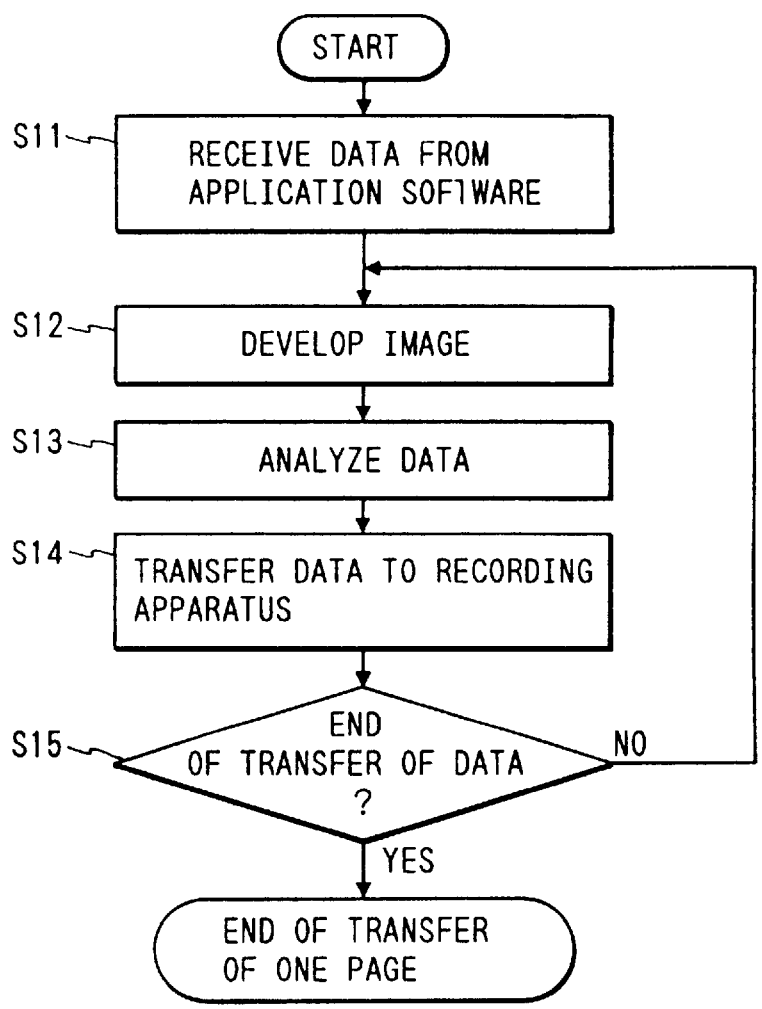

DUAL DIRECTIONAL RECORDING APPARATUS AND RECORDING SYSTEM

BACKGROUND OF THE INVENTION

1. Field of the Invention

The present invention relates to a serial type dual directional recording apparatus and recording system for performing main scan by horizontally moving a carriage mounting a recording head and, more particularly, to a control scheme for recording image information transferred from a host system.

2. Related Background Art

In conventional recording apparatuses for performing recording by horizontally scanning a carriage mounting a recording head, in recording text information constituted by characters recordable by one-time scan of the recording head, dual directional shortest distance printing is performed for each line in order to improve throughput. On the other hand, when this dual directional recording is performed in image recording, unevenness in the horizontal direction may occur in an output image if the recording direction changes in an image portion continuous in the vertical direction. In conventional apparatuses, therefore, recording is always performed only by single directional carriage scan in recording image information from a host system.

In addition, even in single directional recording, if a head is mounted with an inclination, unevenness sometimes occurs in recording in which a single character is recorded by performing head scan a plurality of times, such as in recording of an enlarged character. The present applicant, therefore, has proposed a recording scheme, disclosed in Japanese Laid-Open Patent Application No. 1-108058, as an example of a recording scheme which does not degrade accuracy in recording positions in the vertical direction in recording of a text transferred in the form of an image. In this recording scheme, in recording characters, recording is performed by using elements in a number corresponding to the character size to be recorded; whereas in recording data other than characters, recording is performed by using all of the elements.

As described above, since dual directional recording is performed in the recording of text information, throughput is improved. However, it is difficult to improve the throughput for images because single directional recording is always performed in recording of images.

In addition, although all the recording elements are used in image recording in order to increase the recording rate, there is a demand for a higher recording rate (throughput).

U.S. Pat. No. 5,044,796 discloses a method of realizing dual directional recording even in recording of images, thereby increasing the recording rate. This method permits dual directional recording when a break is detected from received image data.

In this method, however, processing for detecting a break increases the load on a CPU of a printer, and this may bring about a reduction in throughput. In addition, the break detection must be performed even in recording of text information, resulting in an inefficient operation.

SUMMARY OF THE INVENTION

It is, therefore, an object of the present invention to provide a dual directional recording apparatus and recording system capable of improving throughput without producing unevenness in the horizontal direction even in image recording.

It is another object of the present invention to provide a dual directional recording apparatus and recording system capable of avoiding an increase in load on a CPU of a printer.

In order to achieve the above object of the present invention, there is provided a serial scan type dual directional recording apparatus for recording received recording data by using a recording head in which a plurality of recording elements are arranged, comprising:

receiving means for receiving commands for designating the number of recording dots and a recording direction from a host system, the number of recording dots indicating the number of the recording elements to be used in one-time scan, and the recording direction including a single direction by which recording is performed by scan in the same direction as a preceding scan and a dual direction by which recording is performed by scan in a direction opposite to that of a preceding scan; and control means for controlling recording on the basis of the recording dot number command and the recording direction command received.

In addition, in order to achieve the above objects of the present invention, there is provided a dual directional recording system, comprising:

a serial scan type dual directional recording apparatus for recording received recording data by using a recording head in which a plurality of recording elements are arranged, the recording apparatus including receiving, means for receiving commands for designating the number of recording dots and a recording direction from a host system, the number of recording dots indicating the number of the recording elements to be used in one-time scan, and the recording direction including a single direction by which recording is performed by scan in the same direction as a preceding scan and a dual direction by which recording is performed by scan in a direction opposite to that of a preceding scan, and control means for controlling recording on the basis of the recording dot number command and the recording direction command received; and a host computer for transmitting the recording data and the commands to the recording apparatus.

Furthermore, in order to achieve the above objects of the present invention, there is provided a serial scan dual directional recording method for recording received recording data by using a recording head in which a plurality of recording elements are arranged, comprising the steps of:

receiving commands for designating the number of recording dots and a recording direction, the number of recording dots indicating the number of the recording elements to be used in one-time scan, and the recording direction including a single direction by which recording is performed by scan in the same direction as a preceding scan and a dual direction by which recording is performed by scan in a direction opposite to that of a preceding scan; and controlling recording on the basis of the recording dot number command and the recording direction command received.

Also, in order to achieve the above objects of the present invention, there is provided a serial scan type dual directional recording method for recording received recording data by using a recording head in which a plurality of recording elements are arranged, comprising the steps of:

generating commands for designating the number of recording dots and a recording direction from a host system, the number of recording dots indicating the number of the recording elements to be used in one-time scan, and the recording direction including a single direction by which recording is performed by scan in the same direction as a preceding scan and a dual direction by which recording is performed by scan in al direction opposite to that of a preceding scan; and controlling recording on the basis of the recording dot number command and the recording direction command generated.

BRIEF DESCRIPTION OF THE DRAWINGS

FIG. 2 is a block diagram showing the arrangement of a control system according to an embodiment of the present invention;

FIGS. 3A and 3B are views showing examples of recording according to the present invention;

FIG. 4 is a flow chart for explaining a printer driver according to the first embodiment;

FIGS. 5A and 5B are flow charts showing the details of page scan shown in FIG. 4;

FIGS. 7A to 7D are views showing the formats of control commands; and

FIG. 8 is a flow chart for explaining a printer driver according to the second embodiment of the present invention.

DESCRIPTION OF THE PREFERRED EMBODIMENTS

Embodiments of the present invention will be described in detail below with reference to the accompanying drawings.
(First embodiment)

Figure 1:
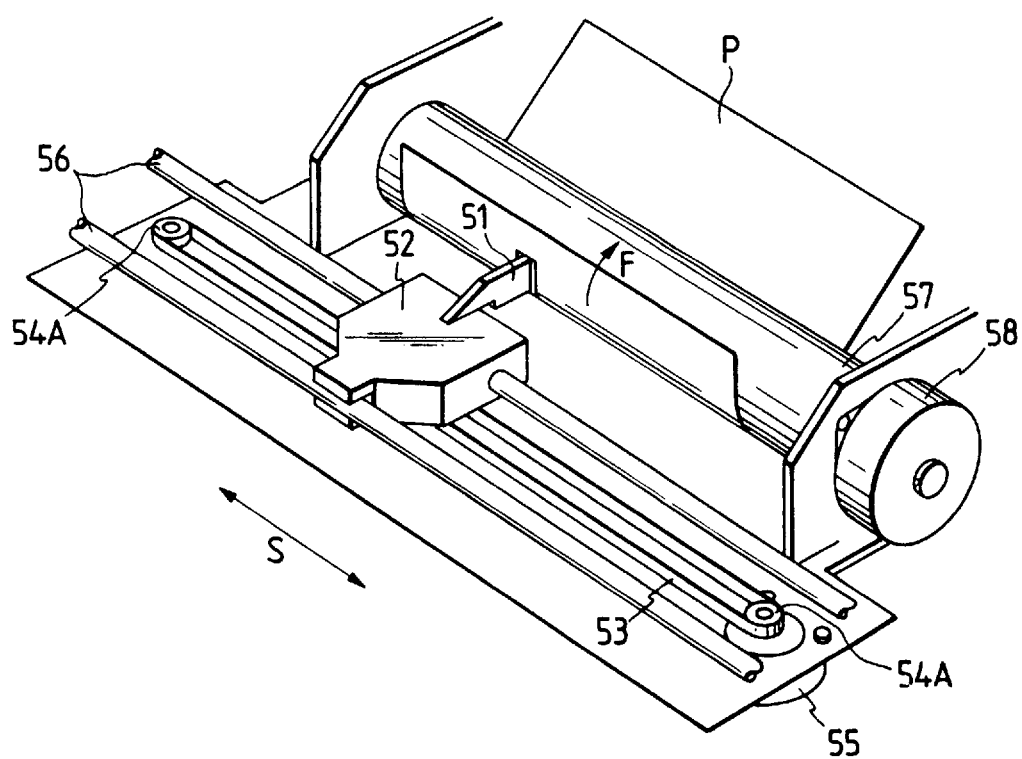
FIG. 1 is a schematic view showing the arrangement of a recording apparatus applicable to the present invention.

FIG. 1 is a perspective schematic view showing a mechanical arrangement of a recording apparatus to which this embodiment is applicable. This recording apparatus comprises a recording head 51, a carriage 52 for mounting the recording head 51, and a belt 53 looped between pulleys 54A and 54B and having the carriage 52 fixed on it. The apparatus also includes a carriage motor 55 assembled to the pulley 54A to move the carriage 52 in a main scan direction S via the belt. 53, and guide shafts 56 for the carriage 52, which extend in the main scan direction S.

A platen roller 57 is for adjusting the recording surface of a recording medium P and feeding the recording medium P in a sub scan direction F. A paper feed motor 58 is coupled to the platen roller 57 to feed the recording medium P. The above recording head has 64 elements (eject portions for ejecting ink, such as nozzles or orifices) for forming dots.

FIG. 2 is a block diagram showing the arrangement of a control system of this embodiment. Referring to FIG. 2, a host system 100 sends image data and the like to a recording apparatus (printer) 200. The host system 100 comprises a data generator unit 101 for generating the image data and the like, and a printer driver unit 102 for converting the image data into a form suitable for the recording apparatus 200.

The recording apparatus 200 comprises a controller unit 201 and a printer unit 202. The controller unit 201 receives data, such as image data, from the host system 100 and converts the received data into a form suitable for the printer unit 202. The control unit 201 also controls the individual parts of:the printer unit 202. The controller unit 201 comprises an MPU in the form of a microprocessor, a ROM storing programs corresponding to procedures to be described later, and a RAM for storing working areas, received data, and image data. The arrangement of the printer unit 202 is as shown in FIG. 1.

FIG. 3A shows the result of recording according to this embodiment, in which text data transferred in the form of an image is recorded in a dual directional manner. In this embodiment, the text data has a width (height) of 40 dots. FIG. 3B shows the result of conventional single directional recording using all of the 64 elements of the recording head. Referring to FIGS. 3A and 3B, symbols a to d indicate scan operations of the carriage. In FIG. 3A, scan operations a and c are performed from left to right, and scan operations b and d are performed from right to left; that is the scan is performed in a dual directional manner. In FIG. 3B, on the other hand, all scan operations a to d are always performed from left to right in a single directional manner.

Practical processing for performing the recording control in FIG. 3A will be described below by focusing attention on the operation of the printer driver 102 in the host system 100.

Upon receiving data to be recorded that has been transferred from application software (data generator unit 101), the printer driver 102 performs image development on the basis of the transferred data. For example, in the case of a text, style (attribute) information concerning a font type, the number of points, the presence/absence of bold and under line, and the like is transferred in the form of codes corresponding to characters. On the basis of this information, the printer driver 102 performs image development of the text portion on the designated position of a page in accordance with the resolution of the recording apparatus 200. On the other hand, image data read by a scanner (not shown) or formed by the application software 101 is transferred in the form of an image, together with position designation information, from the application software 101. The printer driver 102 similarly performs image development by executing processing corresponding to the resolution of the recording apparatus 200. Graphic information representing a rectangle, a straight line, a circle, or the like is transferred to the printer driver 102 together with information concerning a thickness, a type of line, the presence/absence of solid painting, and contents of solid painting. The printer driver 102 also performs image development on the basis of predetermined rules or numerical formulas corresponding to the graphic and in accordance with the resolution of the recording apparatus 200.

The above processing will be described in detail below with reference to a flow chart shown in FIG. 4.

In step S1, the printer driver 102 receives various information as described above from the application software 101. In step S2, the printer driver 102 analyzes the data by performing scanning for each page. FIG. 5A shows a functional flow chart of this scanning, and FIG. 5B illustrates a detailed flow chart of the scanning.

Referring to FIG. 5A, the printer driver 102 checks in step S21 whether text data is present. If text data is present in step S211, the printer driver 102 checks in step S212 whether the number of points, i.e., the character height of the font used in that data falls within the range recordable by one-time horizontal scan of the head of the recording apparatus 200. If the number of points falls within this range, the printer driver 102 checks in step S213 whether a blank, with which unevenness in the vertical direction is negligible even in dual directional recording, is present between lines; that is, in the case wherein the recording apparatus 200 uses a 64-element head with a resolution of 360 dpi, the printer driver 102 checks whether a blank of 10 elements or more, i.e., 1/36 inch or more is present above the text portion. The printer driver 102 also checks in step S22 of FIG. 5A whether multiple columns are present. In this case, even if the text is determined to have multiple columns in step S221, when the printer driver 102 determines in step S222 that the columns will not become uneven in the vertical direction, i.e., that the text has a blank, the printer driver 102 designates the recording apparatus 200 to perform recording of that text portion having the blank by using the minimum number of elements corresponding to the font height, and also designates implementation of dual directional recording in step S241.

In addition, the printer driver 102 checks an image overlapping area in step S23 of FIG. 5A or step S231 of FIG. 5B.

Figure 6:
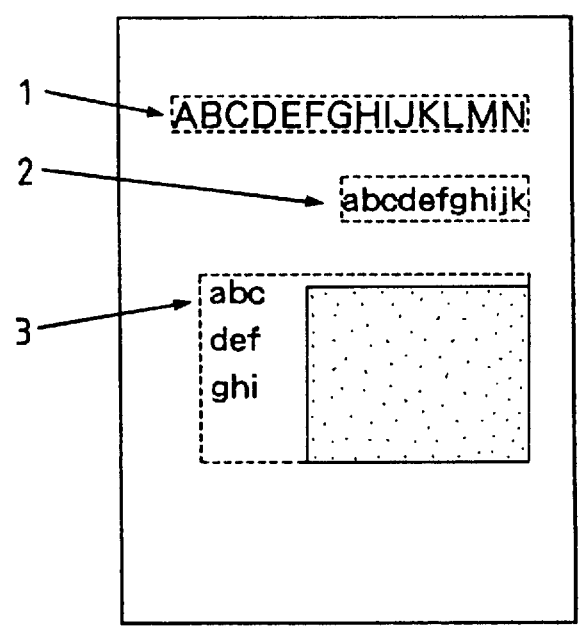
FIG. 6 is a view showing an example of recording according to the present invention.

An image portion except the text may have a blank in the vertical direction for each image block, as shown in FIG. 6. Therefore, similar to the case of the text described above, a portion where dual directional recording is possible is produced in the boundary between image blocks. To record a portion 3 shown in FIG. 6, the printer driver 102 designates that only scan in upper boundary recording of this portion, with respect to its lower end recording, is performed in a dual directional manner. The printer driver 102 also maximizes the number of elements to be used in the recording apparatus 200, determines a recording range for each image block, and designates single directional recording in this range (step S242 of FIG. 5B). If the size of that region in the vertical direction is indivisible by the number of elements of the recording apparatus 200, the fraction is set as the number of elements to be used, and recording is performed by scan in one direction.

Of the information transferred from the application software 101, graphic data is information, such as a circle or a straight line, producible by arithmetic operations. So if a region continuous in the vertical direction is detectable before actual image formation, the length of the continuous range in the vertical direction is also detectable. Therefore, it is possible to designate the number and range of recording elements, and the recording direction for each continuous portion.

In this manner, scan is performed for each page to form management data in the vertical direction in step S2, actual image development is performed in step S3, and commands and data are transferred to the recording apparatus 200 in steps S4 and S5.

Examples of commands to be transmitted to the recording apparatus 200 in recording the data shown in FIG. 6 will be described below. FIGS. 7A to 7D illustrate format examples of control commands used in this embodiment.

The data shown in FIG. 6 is transferred in sequence from its upper end portion to the recording apparatus 200 on the basis of the vertical management information obtained in advance by page-by-page scan. A portion 1 contains text data alone, i.e., has blanks in its upper and lower ends. Hence, when the number of elements of the recording apparatus is 64, setting is made (FIG. 7A) such that recording is performed using 40 elements in a dual directional manner with respect to preceding data, together with setting of record start position information (FIG. 7B) and record height information (FIG. 7C), and image data (FIG. 7D) of that area is transmitted to the recording apparatus. A portion 2 has a blank with respect to the preceding text data. Therefore, the designation of 40-element dual directional recording is also applied together with the record start position information and the record height information, and then the image information is transmitted.

An area 3 can also be recorded in a dual directional manner with respect to the area 2, so setting is made such that dual directional recording is performed for this area with respect to the area 2, as the preceding block. However, since the area 3 contains an image portion in addition to text, the height of the image 3, e.g., 200 is designated as the number of elements for this recording area. In this case, assume that if the number of elements required by a recording area is larger than the number of elements of the recording apparatus, the recording apparatus automatically performs recording of that area in a single directional manner with respect to data of the preceding line. Therefore, in order to record the block 3, information to be transmitted to the recording apparatus contains the record start position, setting of dual directional recording, the number of elements, i.e., the data height of the recording area, and image data in this area. In the above example, the number of elements of a recording area is allowed to exceed 64, as the number of elements of the recording apparatus 200. However, an image may be divided by setting the data quantity to 64, and a command may be supplied to set single directional recording for the second and subsequent lines.

With this arrangement, the recording direction can be changed for each block even in recording of image information if a blank exists in each boundary between blocks.

In the above embodiment, carriage scan is performed once for each line of a text. If, however, the number of points of the font is so small that recording of two lines or more is possible by one-time scan, two lines can be recorded by one-time scan by setting the number of elements to a number twice the font height plus the space between lines.

In the recording apparatus 200, on tie other hand, recording paper is fed on the basis of the received record start position designation command (FIG. 7B) such that the uppermost elements of the recording head are arranged at the designated position. Upon receiving data in an amount corresponding to the element height, the recording apparatus 200 performs recording by head scan in a direction determined by the record direction command (FIG. 7A).

According to this embodiment as described above, to record image information transmitted from the host system, the image information to be transmitted is analyzed by the host system. Designations are made for the number of elements to be used in recording of a designated range and for the recording direction. For a portion having blanks in the vertical direction, dual directional recording is performed by setting that portion as a boundary. This makes it possible to maintain a high throughput of the dual directional recording even in image recording.

In addition, since the data analysis is performed by the host system, the load on a CPU of the recording apparatus can be reduced.

Furthermore, since the data analysis is performed when data are expressed in the form of codes before image development, the analysis can be performed in a short time. This is so because in the case of text information, the possibility of dual directional recording can be determined by checking the number of points and the like as described above.

(Second embodiment)

The second embodiment of the present invention will be described below.

In the above first embodiment, data analysis is performed to detect continuous and discontinuous portions of an image in the vertical direction before actual image formation. In this second embodiment, data analysis is performed after image information is formed into a format to be transmitted to a recording apparatus 200 on the basis of information from application software 101.

FIG. 8 is a flow chart for explaining a printer driver 102 according to this embodiment. Upon receiving data from the application software 101 in step S11, the printer driver 102 develops the data into an image to be recorded by the recording apparatus 200 in step S12. In step S13, the printer driver 102 checks whether a portion where all rasters are blanks is present in the information developed into the image. If such a portion exists, the printer driver 102 designates the number of elements for use in recording, i.e., the recording range in the vertical direction in accordance with the distance in the vertical direction of an area including the start position and the lowermost portion of that image and sandwiched between the blank portions, thereby setting dual directional recording using the blank portion or a plurality of blank portions as boundaries.

If no blank portion is detected in a given area, the printer driver 102 designates a recording range in the vertical direction such that recording is performed using the maximum number of elements. The printer driver 102 also designates that the recording operation is performed in a single directional manner. These settings are made by using the commands shown in FIG. 7, as in the first embodiment. After making the above designations, the printer driver 102 performs actual image data transfer in steps S4 and S5.

This second embodiment can also reduce the load on a CPU of the recording apparatus because the data analysis is executed by the host system.

A practical example of the analysis performed after image formation has been described above. It is also possible to combine the method of the first embodiment and the method of this second embodiment; that is, it is possible to perform data analysis before image formation for a text portion, and after image formation for information other than a text.

Moreover, the printing means is not limited to an ink jet type recording head but may be another common recording head, such as a thermal head.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and, contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal,transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A serial scan type dual directional recording apparatus for recording received recording data by using a recording head in which a plurality of recording elements are arranged, said apparatus comprising:

receiving means for receiving (1) commands, including a recording dot number command for designating the number of recording dots and a recording direction command, from a host system, and (2) data based on an image to be recorded by said recording head, wherein the number of recording dots indicates the number of said recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan; and control means for controlling recording on the basis of the recording dot number command and the recording direction command received, wherein the host system determines whether to send the command for the single direction operation or the command for the dual direction operation on the basis of characteristics of the recording data.

2. An apparatus according to claim 1, wherein said control means performs recording by using all of said recording elements when the number of recording dots is larger than the number of said recording elements of said recording head.

3. An apparatus according to claim 1, wherein said recording head ejects an ink.

4. An apparatus according to claim 3, wherein said recording head includes a plurality of eject portions for ejecting the ink, and thermal energy generating means, provided in a one-to-one correspondence with said eject portions, for inducing a thermal state change in ink to eject the ink from said eject portions by that state change, thereby forming flying ink droplets.

5. An apparatus according to claim 1, wherein the characteristics of the recording data indicate continuity between a present scan and the preceding scan.

6. A dual directional recording system, comprising:

a serial scan type dual directional recording apparatus for recording received recording data by using a recording head in which a plurality of recording elements are arranged, said recording apparatus including:

receiving means for receiving (1) commands, including a recording dot number command for designating the number of recording dots and a recording direction command, from a host system, and (2) data based on an image to be recorded by said recording head, wherein the number of recording dots indicates the number of said recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan;

control means for controlling recording on the basis of the recording dot number command and the recording direction command received; and a host computer for transmitting the recording data and the commands to said recording apparatus, wherein the host system includes said host computer and the host computer determines whether to transmit the command for the single direction operation or the command for the dual direction operation on the basis of characteristics of the recording data.

7. A system according to claim 6, wherein said host computer includes extracting means for extracting a text portion by scanning drawing information in units of pages, and transmitting means for transmitting, when the height of characters used in the extracted text falls within the range of the width of said recording elements of said recording head of said recording apparatus, the recording dot number command corresponding to the character height to be recorded, and the recording direction command for setting the dual direction as a recording direction for a portion constituted by text alone, for recording of the text portion.

8. A system according to claim 7, wherein when the extracted text is constituted by multiple columns and a blank portion is detected between the multiple columns, said transmitting means transmits the recording direction command for setting the dual direction as a recording direction for data of one scan width after that blank portion.

9. A system according to claim 6, wherein said host computer includes extracting means for extracting image block portions by scanning drawing information in units of pages, and transmitting means for transmitting, when a blank portion is detected between the extracted image blocks, the recording direction command for setting the dual direction as a recording direction for data of one scan width after that blank portion.

10. A system according to claim 6, wherein said host computer includes developing means for developing drawing information into recording data to be transmitted to said recording apparatus, and analyzing means for analyzing the developed data, said analyzing means transmitting, when a continuous blank portion with not less than a predetermined width is detected in the vertical direction in the developed data, the recording direction command for setting the dual direction as a recording direction for data of one scan width after that blank portion.

11. A system according to claim 6, wherein said host computer includes developing means for developing drawing information into recording data to be transmitted to said recording apparatus, and analyzing means for analyzing the developed data, said analyzing means transmitting, when a plurality of continuous blank portions with not less than a predetermined width are detected in the vertical direction in the developed data and the height of an area sandwiched between the blanks falls within the range of the width of said recording elements of said recording apparatus, the recording dot number command corresponding to the width of data to be recorded in the vertical direction and the recording direction command for setting the dual direction as a recording direction, for recording of that area.

12. A system according to claim 6, wherein said recording head ejects an ink.

13. A system according to claim 12, wherein said recording head includes a plurality of eject portions for ejecting the ink, and thermal energy generating means, provided in a one-to-one correspondence with said eject portions, for inducing a thermal state change in ink to eject the ink from said eject portions by that state change, thereby forming flying ink droplets.

14. A system according to claim 6, wherein the characteristics of the recording data indicate continuity between a present scan and the preceding scan.

15. A serial scan dual directional recording method for recording received recording data by using a recording head in which a plurality of recording elements are arranged, said method comprising the steps of:

receiving (1) commands, including a recording dot number command for designating the number of recording dots and a recording direction command, from a host system, and (2) data based on an image to be recorded by the recording head, wherein the number of recording dots indicates the number of the recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan; and controlling recording on the basis of the recording dot number command and the recording direction command received, wherein the host system determines whether to send the command for the single direction operation or the command for the dual direction operation on the basis of characteristics of the recording data.

16. A method according to claim 15, wherein said controlling step performs recording by using all of the recording elements when the number of recording dots is larger than the number of the recording elements of the recording head.

17. A method according to claim 15, wherein the recording head ejects an ink.

18. A method according to claim 17, wherein the recording head includes a plurality of eject portions for ejecting the ink, and thermal energy generating means, provided in a one-to-one correspondence with the eject portions, for inducing a thermal state change in the ink to eject the ink from the eject portions by that state change, thereby forming flying ink droplets.

19. A method according to claim 15, wherein the characteristics of the recording data indicate continuity between a present scan and the preceding scan.

20. A record control method for recording received recording data by using a recording head in which a plurality of recording elements are arranged, said method comprising the steps of:

generating (1) commands, including a recording dot number command for designating the number of recording dots and a recording direction command, from a host system, and (2) data based on an image to be recorded by the recording head, wherein the number of recording dots indicates the number of the recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan; and controlling recording on the basis of the recording dot number command and the recording direction command generated, wherein the host system determines whether to send the command for the single direction operation or the command for the dual direction operation on the basis of characteristics of the recording data.

21. A method according to claim 20, wherein the generating step comprises substeps of extracting a text portion by scanning drawing information in units of pages, and generating, when the height of characters used in the extracted text falls within the range of the width of the recording elements of the recording head of the recording apparatus, the recording dot number command corresponding to the character height to be recorded, and the recording direction command for setting the dual direction as a recording direction for a portion constituted by text alone, for recording of the text portion.

22. A method according to claim 21, wherein when the extracted text is constituted by multiple columns and a blank portion is detected between the multiple columns, said generating step generates the recording direction command for setting the dual direction as a recording direction for data of one scan width after that blank portion.

23. A method according to claim 20, wherein said generating step comprises substeps of extracting image block portions by scanning drawing information in units of pages, and generating, when a blank portion is detected between the extracted image blocks, the recording direction command for setting the dual direction as a recording direction for data of one scan width after that blank portion.

24. A method according to claim 20, wherein said generating step comprises substeps of developing drawing information into recording data, and analyzing the developed data, said analyzing substep generating, when a continuous blank portion with not less than a predetermined width is detected in the vertical direction in the developed data, the recording direction command for setting the dual direction as a recording direction for data of one scan width after the detected blank portion.

25. A method according to claim 20, wherein said generating step comprises substeps of developing drawing information into recording data, and analyzing the developed data, said analyzing substep generating, when a plurality of continuous blank portions with not less than a predetermined width are detected in the vertical direction in the developed data and the height of an area sandwiched between the blanks falls within the range of the width of the recording elements of the recording apparatus, the recording dot number command corresponding to the width of data to be recorded in the vertical direction and the recording direction command for setting the dual direction as a recording direction, for recording of the area.

26. A method according to claim 20, wherein the recording head ejects an ink.

27. A method according to claim 26, wherein the recording head includes a plurality of eject portions for ejecting the ink, and thermal energy generating means, provided in a one-to-one correspondence with the eject portions, for inducing a thermal state change in the ink to eject the ink from the eject portions by the state change, thereby forming flying ink droplets.

28. A method according to claim 17, wherein the characteristics of the recording data indicate continuity between a present scan and the preceding scan.

29. A printer driver installed in a host system for controlling a serial scan type dual directional recording apparatus for recording received recording data by using a recording head in which a plurality of recording elements are arranged, said printer driver comprising:

analyzing code for analyzing characteristics of an image to be recorded by the recording head; and sending code for sending (1) commands, including a recording dot number command for designating the number of recording dots and a recording direction command, from a host system, and (2) data based on the image to be recorded by the recording head, wherein the number of recording dots indicates the number of the recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan, wherein said sending code determines whether to send the command for the single direction operation or the command for the dual direction operation on the basis of the characteristics of the recording data analyzed by said analyzing code.

30. A printer driver according to claim 29, wherein the characteristics of the recording data indicate continuity between a present scan and the preceding scan.

31. A computer-readable storage medium for storing computer-readable instructions for a printer driver installed in a program-controlled host system for controlling a serial scan type dual directional recording apparatus for recording received recording data by using a recording head in which a plurality of recording elements are arranged, said computer-readable instructions comprising:

analyzing code for analyzing characteristics of an image to be recorded by said recording head; and sending code for sending (1) commands, including a recording dot number command for designating the number of recording dots and a recording direction command, from a host system, and (2) data based on the image to be recorded by said recording head, wherein the number of recording dots indicates the number of said recording elements to be used in a scan, and the recording direction command is a command for either a single direction operation, by which recording is performed by scanning in a same direction as a preceding scan, or a dual direction operation, by which recording is performed by scanning in a direction opposite to that of the preceding scan, wherein said sending code determines whether to send the command for the single direction operation or the command for the dual direction operation on the basis of the characteristics of the recording data analyzed by said analyzing code.

32. A computer-readable storage medium according to claim 31, wherein the characteristics of the recording data indicate continuity between a present scan and the preceding scan.

* * * * *

UNITED STATES PATENT AND TRADEMARK OFFICE
CERTIFICATE OF CORRECTION

PATENT NO. : 5,819,009
DATED : October 6, 1998
INVENTOR(S) : YOSHIHIRO NAKAGAWA

Page 1 of 2

It is certified that error appears in the above-indentified patent and that said Letters Patent is hereby corrected as shown below:

<u>ON COVER PAGE AT [56] REFERENCES CITED, FOREIGN PATENT DOCUMENTS</u>

"1108058" should read 1-108058.

<u>COLUMN 1</u>

Line 39, "whereas" should read --whereas,--;

<u>COLUMN 2</u>

Line 5, "object" should read --objects--.
Line 15, "be,used" should read --be used--.

<u>COLUMN 3</u>

Line 9, "al" should read --a--.

<u>COLUMN 4</u>

Line 17, "is the" should read --is, the--;
Line 29, "under" should read --under---;

<u>COLUMN 5</u>

Line 19, "except the" should read --other than--;
Line 21, "similar to" should read --as in--.

UNITED STATES PATENT AND TRADEMARK OFFICE
CERTIFICATE OF CORRECTION

PATENT NO. : 5,819,009
DATED : October 6, 1998
INVENTOR(S) : YOSHIHIRO NAKAGAWA

It is certified that error appears in the above-indentified patent and that said Letters Patent is hereby corrected as shown below:

COLUMN 7

Line 67, "and," should read --and--.

COLUMN 8

Line 11, "electrothermal,transducer" should read --electrothermal transducer--;
Line 58, "signal is" should read --signal in--.

COLUMN 13

Line 1, "claim 17," should read --claim 20,--.

Signed and Sealed this

Twenty-eighth Day of September, 1999

Attest:

Q. TODD DICKINSON

Attesting Officer

Acting Commissioner of Patents and Trademarks